United States Patent
Sim et al.

(10) Patent No.: US 9,641,822 B2
(45) Date of Patent: May 2, 2017

(54) METHOD AND APPARATUS FOR PROCESSING THREE-DIMENSIONAL (3D) IMAGES

(75) Inventors: Jae Young Sim, Yongin-si (KR); Do Kyoon Kim, Yongin-si (KR); Kee Chang Lee, Yongin-si (KR); Gael Guennebaud, Zurich (CH); Mario Botsch, Bielefeld (DE); Markus Gross, Zurich (CH); Robert Carnecky, Zurich (CH)

(73) Assignee: Samsung Electronics Co., Ltd., Suwon-si (KR)

( * ) Notice: Subject to any disclaimer, the term of this patent is extended or adjusted under 35 U.S.C. 154(b) by 1295 days.

(21) Appl. No.: 12/379,055

(22) Filed: Feb. 11, 2009

(65) Prior Publication Data

US 2009/0213240 A1    Aug. 27, 2009

(30) Foreign Application Priority Data

Feb. 25, 2008 (KR) .................. 10-2008-0016995
Aug. 27, 2008 (KR) .................. 10-2008-0083922

(51) Int. Cl.
    *H04N 5/228*    (2006.01)
    *G06T 15/00*    (2011.01)
    (Continued)

(52) U.S. Cl.
    CPC ......... *H04N 13/0011* (2013.01); *G06T 17/00* (2013.01); *G06T 17/005* (2013.01); *H04N 13/0003* (2013.01); *H04N 2213/005* (2013.01)

(58) Field of Classification Search
    CPC ....... G06T 15/00; G06T 15/06; G06T 15/205; G06T 15/503
    (Continued)

(56) References Cited

U.S. PATENT DOCUMENTS 5,724,561 A *  3/1998  Tarolli et al. ................. 345/561
6,084,979 A *  7/2000  Kanade ............. H04N 13/0022
                                                  345/424

(Continued)

FOREIGN PATENT DOCUMENTS

JP    2003-91745    3/2003
JP    2004-5373     1/2004
(Continued)

OTHER PUBLICATIONS

Leonid Levkovich-Maslyuk et al., "Depth Image-Based Representation and Compression for Static and Animated 3-D Objects", IEEE Transactions on Circuits and Systems for Video Technology, vol. 14, No. 7, Jul. 2004, pp. 1032-1045.

(Continued)

*Primary Examiner* — Obafemi Sosanya
(74) *Attorney, Agent, or Firm* — NSIP Law

(57) ABSTRACT

Provided is point-based efficient three-dimensional (3D) information representation from a color image that is obtained from a general Charge-Coupled Device (CCD)/Complementary Metal Oxide Semiconductor (CMOS) camera, and a depth image that is obtained from a depth camera. A 3D image processing method includes storing a depth image associated with an object as first data of a 3D data format, and storing a color image associated with the object as color image data of a 2D image format, independent of the first data.

22 Claims, 8 Drawing Sheets

(51) Int. Cl.
*H04N 13/00* (2006.01)
*G06T 17/00* (2006.01)
*G06T 15/04* (2011.01)
*G06T 15/06* (2011.01)

(58) Field of Classification Search
USPC .............................. 345/419, 561; 348/222.1
See application file for complete search history.

(56) References Cited

U.S. PATENT DOCUMENTS

| | | | |
|---|---|---|---|
| 7,167,173 B2 | 1/2007 | Balmelli et al. | |
| 7,215,340 B2 | 5/2007 | Pfister et al. | |
| 7,373,473 B2* | 5/2008 | Bukowski et al. | 711/170 |
| 7,450,132 B2* | 11/2008 | Park | G06T 15/04 |
| | | | 345/422 |
| 2003/0214502 A1* | 11/2003 | Park | G06T 15/205 |
| | | | 345/420 |
| 2007/0070082 A1* | 3/2007 | Brennan | G06T 15/503 |
| | | | 345/592 |
| 2007/0206008 A1* | 9/2007 | Kaufman | G06T 15/06 |
| | | | 345/424 |
| 2008/0225044 A1* | 9/2008 | Huang | G06T 17/00 |
| | | | 345/420 |

FOREIGN PATENT DOCUMENTS

| | | |
|---|---|---|
| JP | 2005-157664 | 6/2005 |
| JP | 2006-285616 | 10/2006 |
| KR | 1998-702317 | 7/1998 |
| KR | 10-2003-0004017 | 1/2003 |
| KR | 10-2006-0043431 | 5/2006 |
| KR | 10-2006-0107899 | 10/2006 |
| KR | 10-2007-0105994 | 10/2007 |
| WO | 97/23097 | 6/1997 |

OTHER PUBLICATIONS

Korean Office Action issued Aug. 11, 2014 in corresponding Korean Patent Application No. 10-2008-0083922, 7 pages.

* cited by examiner

METHOD AND APPARATUS FOR PROCESSING THREE-DIMENSIONAL (3D) IMAGES

CROSS-REFERENCE TO RELATED APPLICATIONS

This application claims the benefit of Korean Patent Application No. 10-2008-0016995, filed on Feb. 25, 2008 and the benefit of Korean Patent Application No. 10-2008-0083922, filed on Aug. 27, 2008, in the Korean Intellectual Property Office, the disclosures of which are incorporated herein by reference.

BACKGROUND

1. Field

One or more embodiments relate to a method of processing a three-dimensional (3D) image, and more particularly, to the storing, processing, and rendering of 3D image information that is obtained using a depth camera and a general imaging camera.

2. Description of the Related Art

Currently, research is being conducted regarding a scheme that can obtain a depth image using a depth camera and obtain a color image using a general Charge-Coupled Device (CCD)/Complementary Metal Oxide Semiconductor (CMOS) camera, and then merge the obtained depth image with the color image to thereby obtain three-dimensional (3D) information.

The obtained 3D information may be represented according to various types of schemes such as a scheme of using a triangular mesh, a scheme of using a point cloud, etc. The obtained 3D information may be transformed into an efficient representation structure through an appropriate modeling process. The processing and rendering performance of the transformation or after the transformation may be greatly affected by the efficiency of the data structure representing the 3D information.

A mesh-based representation may connect adjacent pixels, generate mesh connection information, and thereby process an image based on regularity of the image. The mesh-based representation may relatively easily remove noise, a hole, etc. that may occur in obtaining a depth image. However, in order to generate a single 3D mesh model from a plurality of images, instead of a single image, the mesh-based representation may need an appropriate stitching operation for an overlapping portion. Generally, the stitching operation may be very complex.

A point-based representation may spatially merge 3D points obtained from a plurality of images. Therefore, in comparison to the mesh-based representation, the point-based representation may generate an efficient 3D model. The point data may be stored in a spatial data structure such as kd-tree or octree. The point-based representation may need to efficiently store 3D information and color information for processing such as efficient surface estimation and point re-sampling.

As described above, according to the conventional art, color image data and depth image data of 3D information is stored together.

SUMMARY

An aspect of embodiments of the present invention provides a method and apparatus that can store and process three-dimensional (3D) data obtained from an object using a depth camera and color image data obtained from the object using a Charge-Coupled Device (CCD)/Complementary Metal Oxide Semiconductor (CMOS) camera.

Another aspect of embodiments of the present invention also provides a method and apparatus that can extract a 3D image being viewed from a predetermined point of view for rendering, calculate a color value at each 3D point seen from the point of view for rendering, and perform rendering for the 3D image from the point of view.

Another aspect of embodiments of the present invention also provides a method and apparatus that can efficiently change a resolution of a depth image when there is a need to change the resolution of the depth image, for example, when the resolution of the depth image is different from a resolution of a color image.

According to an aspect of embodiments of the present invention, there is provided a computer-readable recording medium having stored thereon instructions for causing a computer to implement a method of processing a 3D image, the instructions including an instruction set of storing a depth image associated with an object as first data of a 3D data format, and an instruction set of storing a color image associated with the object as color image data of a 2D image format, independent of the first data.

The computer-readable recording medium may further include an instruction set of generating, using a moving least squares (MLS) projection operator, an MLS surface from the first data, an instruction set of obtaining, using a ray-surface intersection with respect to the MLS surface, first depth image data of a first resolution from a first point of view, and an instruction set of merging the first depth image data and the color image data to thereby obtain 3D image data.

Also, the instruction set of storing the color image data may store color images from a plurality of points of views associated with the object, as a plurality of color image data of a 2D data format, independent of the first data. The instruction set of merging to thereby obtain 3D image data may generate second color image data based on a forward projection angle, with respect to a point of view of each of the plurality of color image data, from an intersecting point where a backward projection is made from the first point of view to the MLS surface, and merge the first depth image data with the second color image data to thereby obtain the 3D image data, when color image data of the first point of view is different from the plurality of color image data.

According to another aspect of embodiments of present invention, there is provided a computer-readable recording medium having stored thereon instructions for causing a computer to implement a method of processing a 3D image, the instructions including an instruction set of generating, using an MLS projection operator, an MLS surface from first depth image data, and an instruction set of obtaining, using a ray-surface intersection with respect to the MLS surface, second depth image data of a first resolution.

According to still another aspect of embodiments of present invention, there is provided a computer-readable recording medium having stored thereon instructions for causing a computer to implement a method of processing a 3D image, the instructions including an instruction set of storing a plurality of depth image data corresponding to a plurality of depth images associated with an object, and an instruction set of storing a color image associated with the object as color image data of a 2D data format, independent of the plurality of depth image data.

According to yet another aspect of embodiments of present invention, there is provided an apparatus for processing a 3D image, including a first storage unit storing a depth image associated with an object as first data of a 3D data format, and a second storage unit storing a color image associated with the object as color image data of a 2D image format, independent of the first data.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
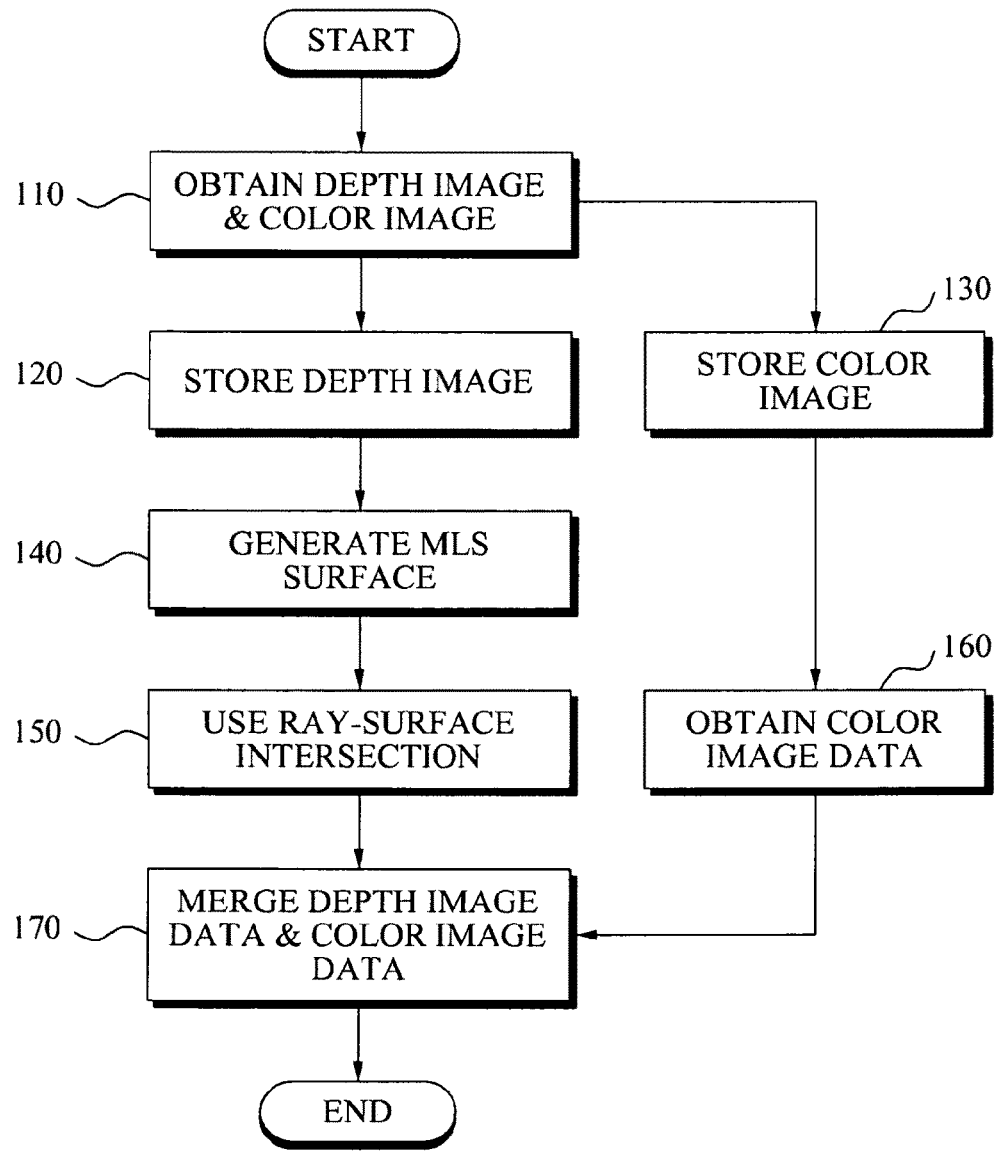
FIG. 1 illustrates a flowchart of a method of processing a three-dimensional (3D) image according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a flowchart of a method of processing a three-dimensional (3D) image according to an embodiment of the present invention.

In operation 110, a depth image of an object may be obtained using a depth camera. A color image of the object may be obtained using a Charge-Coupled Device (CCD)/Complementary Metal Oxide Semiconductor (CMOS) camera. The depth camera may obtain the depth image from the object. A plurality of depth images may be obtained from a plurality of points of views, respectively, by locating the depth camera in the plurality of points of views. The CCD/CMOS camera may obtain the color image from the object. A plurality of color images may be obtained from a plurality of points of views by locating the CCD/CMOS camera in the plurality of points of views with respect to the object. In this instance, the depth image and the color image may have a different resolution.

In operation 120, the depth image associated with the object may be stored as data of a 3D data format. The 3D data format may be a data format that can represent 3D position information of the object. The 3D data format may include a hierarchical point data format such as kd-tree, octree, etc. The hierarchical point data format may be a data structure that includes a hierarchical structure to represent spatial position information of points constituting the object. Hereinafter, an example of using octree for the 3D data format will be described, but embodiments of the present invention are not limited thereto.

According to an aspect of embodiments of the present invention, a plurality of depth images associated with an object may be obtained from a depth camera that is located in a plurality of points of views. In this case, a plurality of depth image data may be stored respectively corresponding to the plurality of depth images associated with the object. The depth image data may be stored independent of color image data. The plurality of depth image data may be merged into single data of a 3D data format and thereby be stored. According to an aspect of embodiments of the present invention, octree may be used for the 3D data format. In this case, the plurality of depth image data may be easily inserted into the octree. Therefore, single depth image data obtained from the depth camera may correspond to a single point of view, whereas data stored in the octree may include all the depth image data being viewed from the plurality of points of views. Thus, it is possible to more specifically represent 3D position information of the object. As described above, the plurality of depth images may be combined into a single hierarchical point cloud representation.

In operation 130, the color image associated with the object may be stored as color image data of a 2D data format. The 2D data format may be a data format that includes 2D position information of the object. For example, according to an aspect of embodiments of the present invention, the color image data may be stored in a Red-Green-Blue (RGB) format. When representing the object on a 2D plane, the RGB format may store a color value of each pixel.

According to an aspect of embodiments of the present invention, a plurality of color images associated with an object may be obtained from a CCD/CMOS camera that is located in a plurality of points of views. In this case, a plurality of color image data may be stored respectively corresponding to the plurality of color images associated with the object. The color image data may be stored independent of depth image data. Also, the color image data may be stored independent of data of an octree format where the plurality of depth image data is merged. The plurality of color image data may have the same resolution.

In operation 140, an image processing apparatus may generate, using a projection operator, a projection surface from the data of the 3D data format. For example, the image processing apparatus may generate, using a moving least squares (MLS) operator, an MLS surface from the data of the 3D data format. The MLS operator may be applied to the single hierarchical point cloud representation, for example, the data of the 3D data format, generated from the plurality of depth images. In this case, the image processing apparatus may generate a continuous and smooth MLS surface from the data.

According to an aspect of embodiments of the present invention, the single hierarchical point cloud representation, for example, the depth images stored in the octree format, may be generated from the plurality of depth images.

According to another aspect of embodiments of the present invention, the hierarchical point cloud representation may be generated from a single depth image. In this case, the MLS surface may be generated from single depth image data using the MLS projection operator.

In operation 150, the image processing apparatus may obtain, using a ray-surface intersection with respect to the MLS surface, first depth image data of a first resolution from a first point of view. Specifically, the image processing apparatus may obtain depth image data of a desired resolution from a desired point of view using the ray-surface intersection. Also, it is possible to obtain depth image data appropriate for a desired resolution of a 3D image to be obtained through rendering. For example, it is possible to obtain, using the ray-surface intersection, depth image data of the same resolution as the resolution of color image data that is to be merged with the depth image data.

In operation 160, the image processing apparatus may obtain color image data of the first point of view from the stored plurality of color image data. When the color image data of the first point of view is included in the stored plurality of color image data, the image processing apparatus may simply select the color image data of the first point of view. Conversely, when color image data of the first point of view is different from the plurality of color image data, the image processing apparatus may obtain the color image data of the first point of view through interpolation, using a linear addition of color image data that is selected from the plurality of color image data.

In operation 170, the image processing data may merge the first depth image data with color image data corresponding to the first depth image data to thereby obtain 3D image data. The hierarchical point cloud representation of the depth image data may be linked to the color image data via the projection operator.

Figure 2:
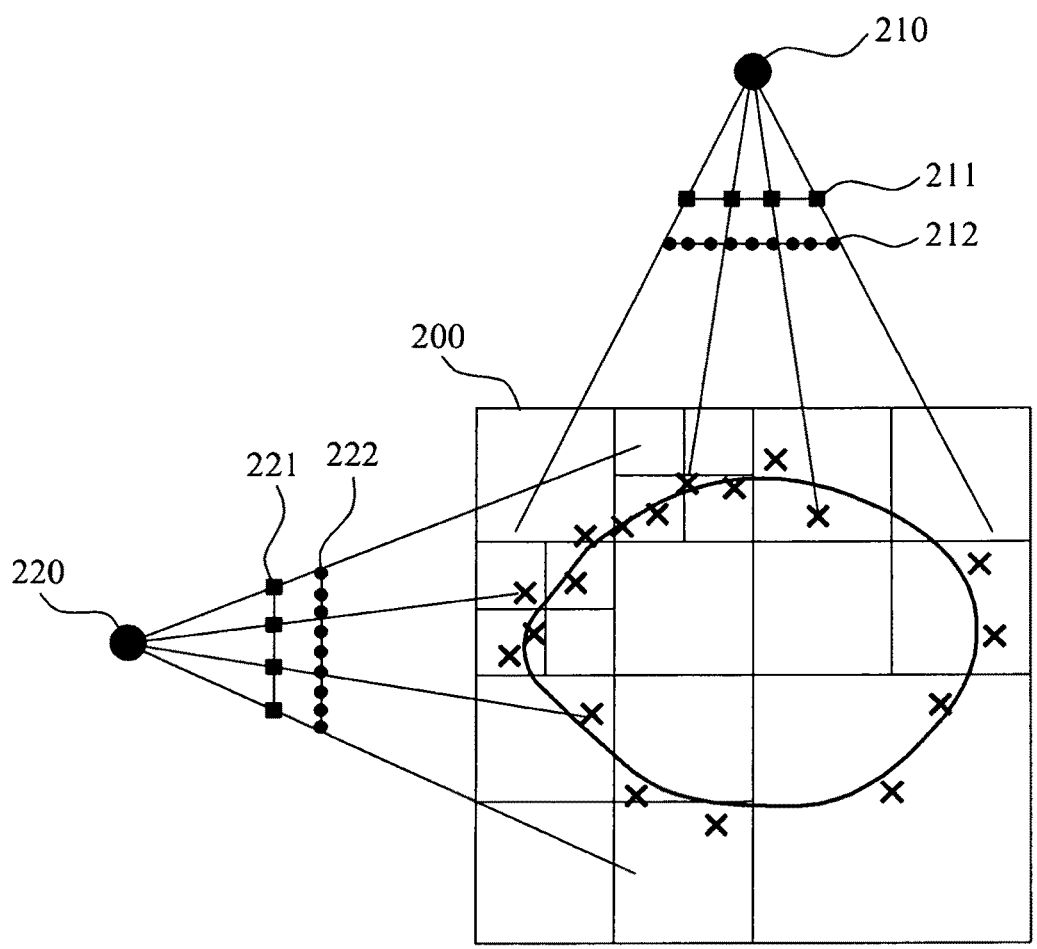
FIG. 2 illustrates a configuration of storing depth image data in an octree structure according to an embodiment of the present invention.

FIG. 2 illustrates a configuration of storing depth image data in an octree structure 200 according to an embodiment of the present invention.

The octree structure 200 may be a tree data structure in which each internal node includes a maximum of eight children. In FIG. 2, the octree structure is shown on a 2D plane. In the 3D space, spatial information of points may be stored in the tree structure with dividing a parent into a maximum of eight children spaces. 3D spatial point cloud associated with a depth image 211 from a first point of view 210 and a depth image 221 from a second point of view 220 may be stored in the octree structure 200. As described above, a plurality of depth image data obtained from a plurality of points of views may be stored in a single octree structure. When using the octree structure 200, it is possible to readily add new depth image data, or to delete depth image data.

A color image 212 is an image obtained from the first point of view 210 and another color image 222 is obtained from the second point of view 220.

Figure 3:
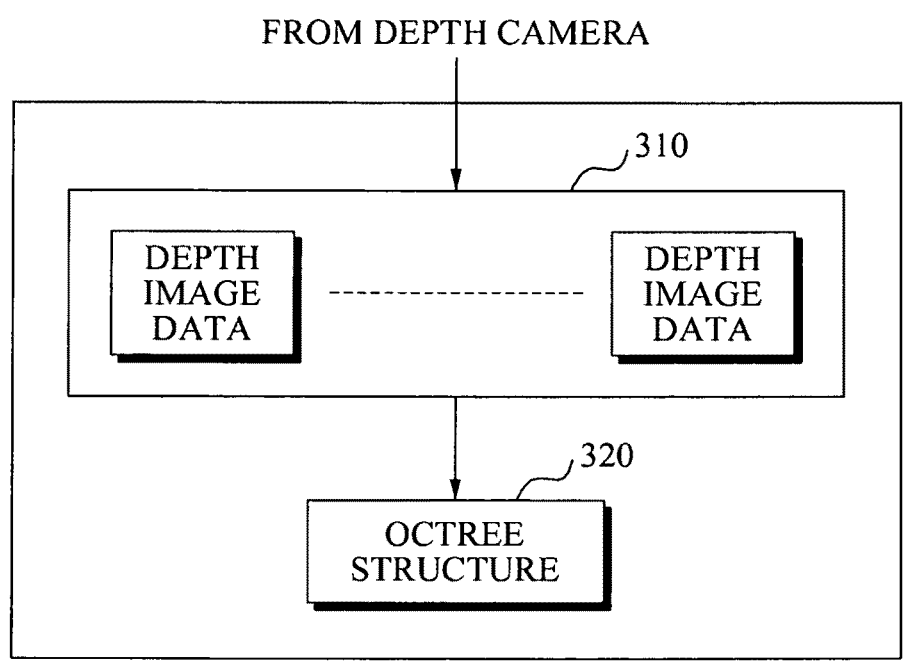
FIG. 3 illustrates a configuration of storing a plurality of depth image data in an octree structure according to an embodiment of the present invention.

FIG. 3 illustrates a configuration of storing a plurality of depth image data in an octree structure 320 according to an embodiment of the present invention.

A plurality of depth images may be obtained from a depth camera that is located at a plurality of points of views. A plurality of depth image data 310 may be stored respectively corresponding to the plurality of depth images. The plurality of depth image data 310 may be merged into single data of a 3D data format and thereby be stored. In the example of FIG. 3, an octree structure 320 is used for the 3D data format. In this case, the plurality of depth image data 310 may be stored in the octree structure 320. Therefore, single depth image data obtained from a single depth camera may correspond to a single point of view, whereas data stored in the octree structure 320 may include all of the depth image data being viewed from the plurality of points of views.

Thus, it is possible to more specifically represent 3D position information of the object.

Figure 4:
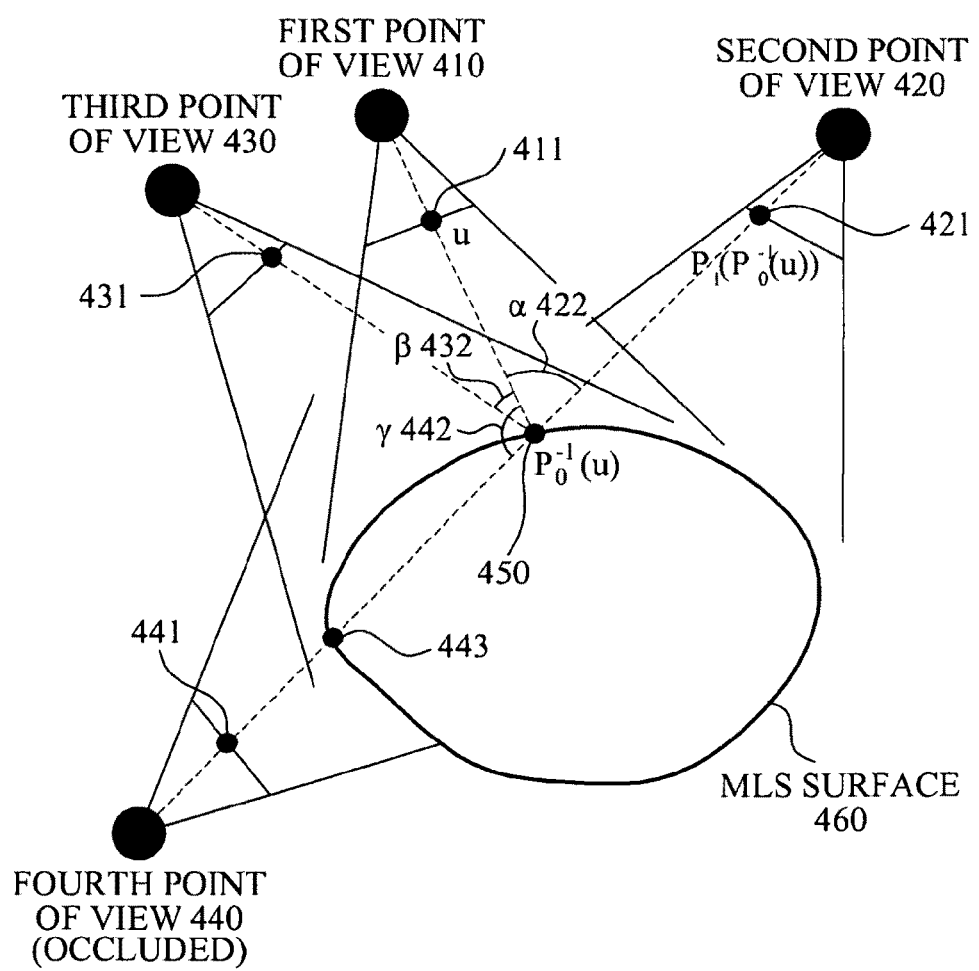
FIG. 4 illustrates an example of sampling color image data from a new point of view, from a plurality of color image data from a plurality of different points of views according to an embodiment of the present invention.

FIG. 4 illustrates an example of sampling color image data from a new point of view, from a plurality of color image data from a plurality of different points of views according to an embodiment of the present invention.

According to an aspect of the present invention, color images being viewed from a plurality of points of views associated with an object may be stored as a plurality of color image data, independent of a hierarchical point cloud representation of depth image data. Each of the plurality of color image data from the plurality of points of views may be stored in a 2D data format. When any one of the plurality of color image data is color image data from the same point of view as the merged depth image data, color image data of the point of view may be selected. For example, referring to FIG. 4, when it is desired to obtain color image data from a first point of view 410 and the stored plurality of color image data includes the color image data from the first point of view 410, the stored corresponding color image data may be used as the color image data from the first point of view 410.

However, when all the plurality of color image data is different from the color image data taken from the same point of view as the depth image data to be merged, it is possible to obtain the color image data from the same point of view using a linear addition of the color image data selected from the plurality of color image data.

For example, when color image data 421 from a second point of view 420, color image data 431 from a third point of view 430, and color image data 441 form a fourth point of view 440 are stored, an example of obtaining color image data 411 from the first point of view 410 will be described. In this case, it is assumed that the color image data 411 from the first point of view 410 is not stored.

As shown in FIG. 4, forward projection angles, an angle alpha 422, an angle beta 432, and an angle gamma 442, with respect to the second point of view 420, the third point of view 430, and the fourth point of view 440 associated with the plurality of color image data 421, 431, and 441 may be obtained from an intersecting point 450 where a backward projection is made from the first point of view 410 to an MLS surface 460. Based on the obtained angles, the angle alpha 422, the angle beta 432, and the angle gamma 442, it is possible to generate the color image data 411 at a pixel u of the first point of view 410.

For example, the color image data 411 may be generated based on a linear addition of the plurality of color image data 421, 431, and 441 using coefficients that are obtained based on the forward projection angles, the angle alpha 422, the angle beta 432, and the angle gamma 442. According to an aspect of the present invention, the linear addition may be given, for example, by Equation 1, provided below.

$$c_0(u) = \sum_{i \in \Omega_k(x)} w_i \cdot c_i(P_i(P_0^{-1}(u)))$$

Equation 1

Here, $C_0(u)$ denotes the color image data 411 at the pixel u, i denotes a serial number of a point of view of each of color image data to obtain the color image data 411. For example, when the second point of view 420 is i=1, $w_1$ may denote a weight according to the angle alpha 422 associated with the second point of view 420. $C_1(P_1(P_0^{-1}(u)))$ may denote color image data 421 that is projected toward a color image in the second point of view 420. $P_0^{-1}(u)$ 450 may denote an intersecting point with the MLS surface 460 that is obtained through the backward projection from the pixel u. $P_1(P_0^{-1}(u))$ may denote points that are obtained by performing forward projection for the second point of view 420 at the intersecting point 450. In the example shown in FIG. 4, i may be any one of the values 1 through 3, but embodiments of the present invention are not limited thereto. i may be any natural number. In FIG. 4, since the fourth point of view 440 is occluded by the MLS surface 460, $w_3=0$ in the above equation.

Various types of schemes may be used to determine an occluded point of view such as the fourth point of view 440.

According to an embodiment of the present invention, it is possible to use a depth image of the same resolution as a resolution of a color image that is pre-obtained using a ray-surface intersection. A distance between the fourth point of view 440 and the intersecting point 450 may be compared with a depth value of direction from the fourth point of view 440 toward the intersecting point 450, that is, a distance between the fourth point of view 440 and a point 443. The distance between the fourth point of view 440 and the point 443 may be obtained from the depth image of the same resolution as the resolution of the color image of the fourth point of view 440. When the distance between the fourth point of view 440 and the intersecting point 450 is greater than the distance between the fourth point of view 440 and the point 443, it may be determined the fourth point of view 440 is an occluded point of view. Accordingly, a weight coefficient $w_3$ associated with the fourth point of view 440 may be set to zero.

The obtained color image data 411 from the first point of view 410 may be merged with depth image data from the first point of view 410 to thereby generate 3D image data.

Figure 5:
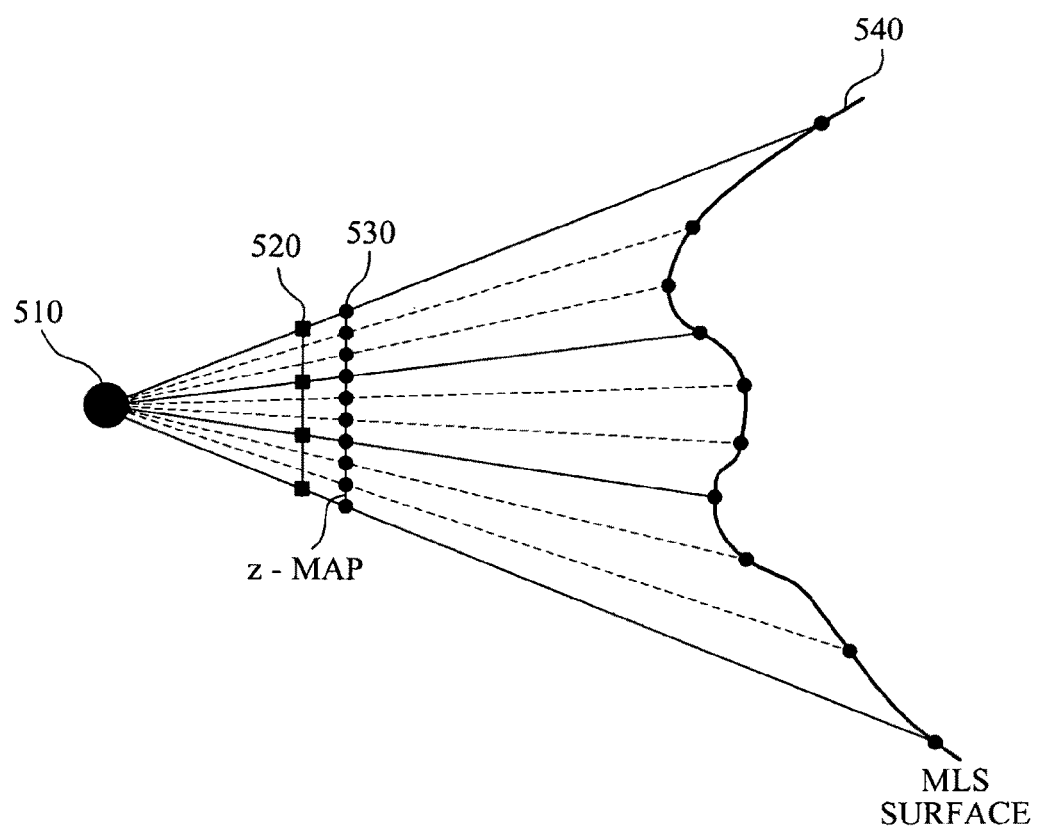
FIG. 5 illustrates an example of obtaining depth image data of the same resolution as a resolution of color image data according to an embodiment of the present invention.

FIG. 5 illustrates an example of obtaining depth image data of the same resolution as a resolution of color image data according to an embodiment of the present invention.

At least one depth image data that includes depth image data 520 from a point of view 510 may be stored in a hierarchical point data format such as octree. A projection surface 540 may be generated from the stored depth image data, using a projection operator. For example, the projection surface 540 may be an MLS surface 540 obtained using an MLS operator. In FIG. 5, single depth image data 520 is used. However, a plurality of depth image data from a plurality of points of views may be used.

In order to merge depth image data with color image data, there is a need for adjusting a resolution of the depth image data to a resolution of the color image data. For example, the resolution of color image data (not shown) to be merged with the depth image data 520 may be the same as a resolution of z-map 530 and the resolution of the depth image data stored in octree may be different from the resolution of the color image data. In this case, z-map 530 of the resolution may be obtained using a ray-surface intersection with respect to the MLS surface 540.

When an object is reconstructed based on the obtained depth image data and color shading is performed using the color image data of the resolution, a desired 3D image may be obtained.

Figure 6:
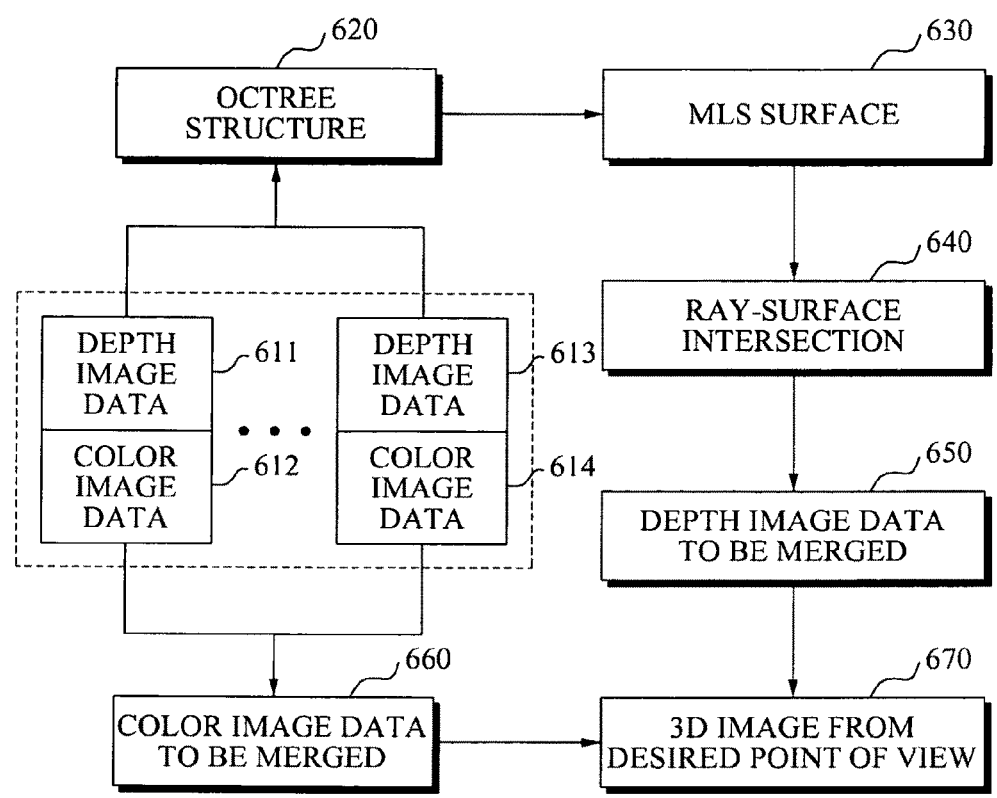
FIG. 6 illustrates an example of processing a 3D image according to an embodiment of the present invention.

FIG. 6 illustrates an example of processing a 3D image according to an embodiment of the present invention.

According to an aspect of embodiments of the present invention, a depth image of an object may be obtained using a depth camera. A plurality of depth images may be obtained depending on a point of view where the depth camera is located with respect to the object. The obtained plurality of depth images may be stored as a plurality of depth image data 611 and 613. The plurality of depth image data 611 and 613 may be stored in a form of a depth map. The plurality of depth image data 611 and 613 may be stored as single data of a hierarchical point data format such as kd-tree, octree, etc. In FIG. 6, the plurality of depth image data 611 and 613 may be stored in a single octree structure 620.

Also, a color image of the object may be obtained using a CCD/CMOS camera. A plurality of color images may be obtained depending on a point of view where the CCD/CMOS camera is located with respect to the object. Therefore, the plurality of color images may be obtained depending on the point of view in association with a single object. The obtained plurality of color images may be stored as a plurality of color image data 612 and 614 of a 2D data format. The plurality of depth image data 611 and 613, and the plurality of color image data 612 and 614 may be physically or logically separated from each other and thereby be stored. The octree structure 620 corresponding to a merged data structure of the plurality of depth image data 611 and 613 may be physically or logically separated from the plurality of color image data 612 and 614 and thereby be stored.

Color image data to be merged 660 may be selected or generated from the plurality of color image data 612 and 614. When the color image data to be merged 660 is included in the plurality of color image data 612 and 614, corresponding color image data may be selected. Conversely, when the color image data to be merged 660 is not included in the plurality of color image data 612 and 614, the color image data to be merged 660 may be generated using the scheme described above with reference to FIG. 4.

An MLS surface 630 may be generated by applying an MLS projection operator to data stored in the octree structure 620. When using a ray-surface intersection 640 with respect to the MLS surface 630, it is possible to obtain depth image data to be merged 650 of the same resolution as a resolution of the color image data to be merged 660.

It is possible to generate a 3D image 670 from a desired point of view by color shading the color image data to be merged 660 according to the depth image data to be merged.

Figure 7:
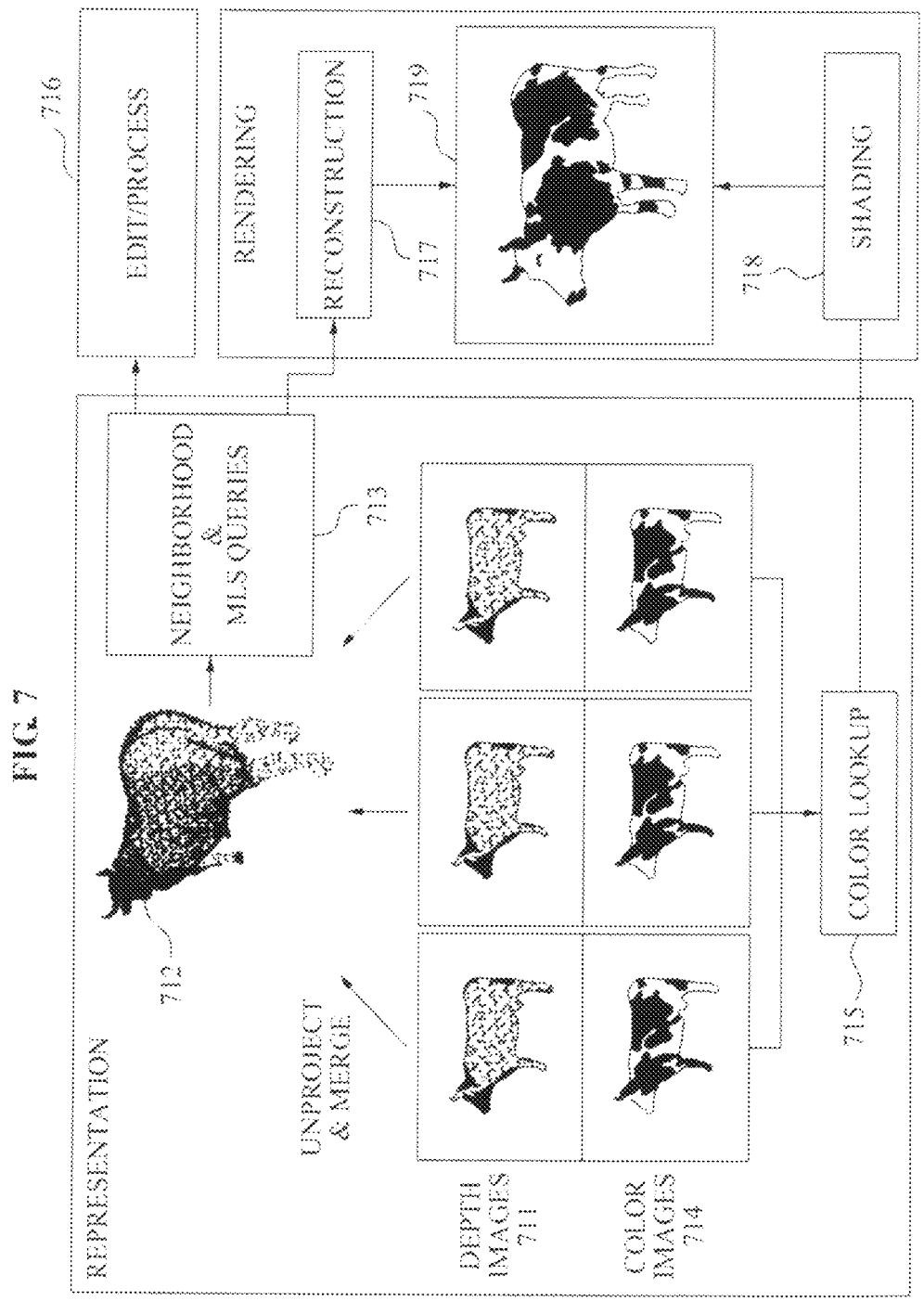
FIG. 7 illustrates an example of representing a cow in 3D using a 3D image data processing method according to an embodiment of the present invention.

FIG. 7 illustrates an example of representing a cow into 3D using a 3D image data processing method according to an embodiment of the present invention.

A depth camera may obtain a plurality of depth images 711 associated with the cow. The plurality of depth images 711 may be obtained depending on a plurality of points of views of the depth camera. A plurality of color images 714 associated with the cow may be obtained from a plurality of points of views using a CCD/CMOS camera. The plurality of depth images 711 may be stored, independent of the plurality of color images 714. The plurality of depth images 711 may be combined into a single hierarchical point cloud representation. For example, the plurality of depth images 711 may be merged into an octree format. In this case, the hierarchical point cloud representation of the depth images 711 stored in the octree format may be stored independent of the plurality of color images 714. An image 712 may be a representation based on the plurality of depth images 711 of the hierarchical point cloud representation. As described above, total 3D information associated with the cow may be obtained by merging the plurality of depth images 711 from the plurality of points of views.

In operation 717, depth image data viewed from a first point of view may be reconstructed, through neighborhood and/or MLS queries 713, from hierarchical point cloud representation. In operation 716, the depth image data from the point of view that is obtained, through the MLS queries, from the hierarchical point cloud representation may be edited and/or processed according to an application.

The color image data being viewed from the first point of view may be obtained from the plurality of color images 714, based on a color lookup 715. Also, the color image data may be obtained based on a linear addition of color values using the backward projection and the forward projection described above with reference to FIG. 4. Since the color image data is color shaded with the depth image data being viewed from the first point of view in operation 718, the color image data may be associated with the depth image data. Through the above-described process, a 3D image 719 from a predetermined point of view may be embodied.

Figure 8:
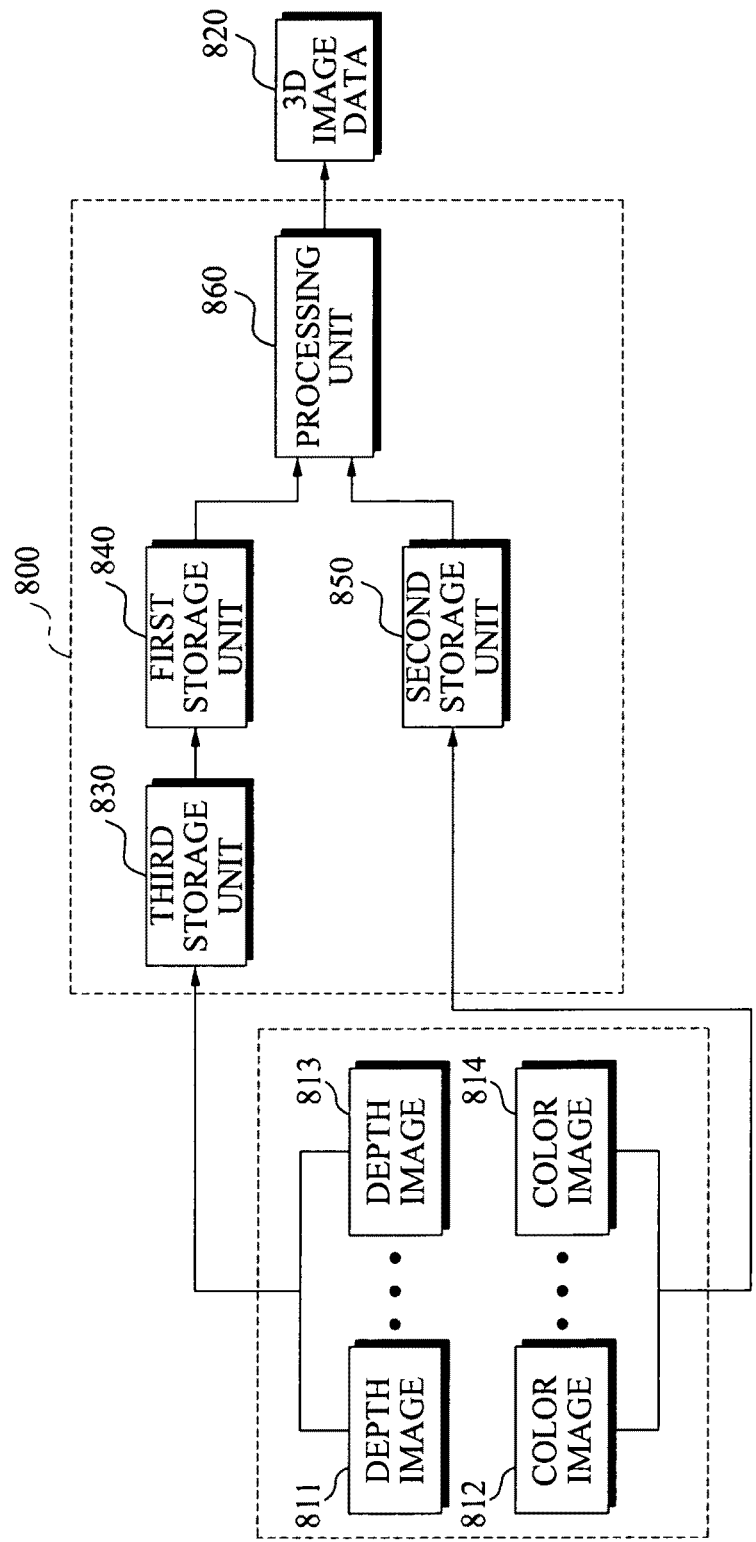
FIG. 8 illustrates a block diagram of a 3D image processing apparatus according to an embodiment of the present invention.

FIG. 8 illustrates a block diagram of a 3D image processing apparatus 800 according to an embodiment of the present invention.

The 3D image processing apparatus 800 includes a first storage unit 840, a second storage unit 850, a third storage unit 830, and a processing unit 860.

The third storage unit 830 may store a plurality of depth image data, independent of color image data. The plurality of depth image data may respectively correspond to a plurality of depth images 811 and 813 that is obtained from an object using a depth camera. Specifically, the plurality of depth images 811 and 813 may correspond to different points of views, respectively.

The first storage unit 840 may store the depth image 811 associated with the object as data of a 3D data format. The 3D data format may be an octree format. For example, the first storage unit 840 may merge the plurality of depth image data stored in the third storage unit 830 into a single data structure, for example, an octree structure, and store the merged depth image data.

The second storage unit 850 may store a color image associated with the object, as color image data of a 2D data format, independent of the data of the 3D data format.

The processing unit 860 may generate, using an MLS projection operator, an MLS surface from the data of the 3D data format. Also, the processing unit 860 may obtain, using a ray-surface intersection with respect to the MLS surface, first depth image data of a first resolution from a first point of view. Also, the processing unit 860 may merge the first depth image data with color image data to thereby obtain 3D image data 820.

According to an aspect of embodiments of the present invention, the second storage unit 850 may store a plurality of color images 812 and 814 from a plurality of points of views associated with the object, as the plurality of color image data of the 2D data format, independent of the 3D data format. In this case, when the color image data of the first point of view is different from the plurality of color image data 812 and 814, the processing unit 860 may generate second color image data based on a forward projection angle, with respect to a point of view of each of the plurality of color image data, from an intersecting point where a backward projection is made from the first point of view to the MLS surface, and merge the first depth image data with the second color image data to thereby obtain 3D image data 820. The second color image data may be generated based on a linear addition of the plurality of color image data using coefficients that are obtained based on the forward projection angle.

According to an aspect of embodiments of the present invention, a plurality of depth images may be combined into a single hierarchical point cloud representation. The hierarchical point cloud representation may be linked to an input color image via a projection operator. The projection operator may be used to connect a depth image with a color image and calculate a z-map of each of a plurality of color images. The z-map may be calculated for an initialization of the hierarchical point cloud representation.

According to an aspect of embodiments of the present invention, an original input color image may be merged with an interpolated depth image. Also, spatial hierarchy storing the input depth image may be merged with the original input color image. The above hierarchical data structure may store a spatial position of an input sample and all the color information represented by the image. According to an aspect of embodiments of the present invention, all the original input data may be maintained. Various types of geometry processing and rendering may be easily defined.

According to an aspect of embodiments of the present invention, a depth image, a color image, and a 3D image may include a still image and a video.

The 3D image processing method according to the above-described embodiments of the present invention may be recorded in computer-readable media including program instructions to implement various operations embodied by a computer. The media may also include, alone or in combination with the program instructions, data files, data structures, etc. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for processing a three-dimensional (3D) image, comprising:
   a first storage unit to store depth image data associated with an object as first data of a 3D data format;
   a second storage unit to independently store a plurality of color images associated with the object as color image data of a 2D image format, independent of the first data; and
   a third storage unit to independently store a plurality of depth images respectively obtained from plural different viewpoints of the object, independent of the color image data;
   a processing unit to generate a 3D image data by merging a selected color image of the plurality of color images with the first data,
   wherein the first storage unit is configured to merge the plurality of depth images stored in the third storage unit and subsequently store the merged plurality of depth images as the first data into a single data structure such that the plural different viewpoints are represented as a unified view.

2. The apparatus of claim 1, wherein the 3D data format is an octree format.

3. The apparatus of claim 1, wherein the processing unit generates, using an MLS projection operator, a moving least squares (MLS) surface from the first data, to obtain, using a ray-surface intersection with respect to the MLS surface, first depth image data of a first resolution from a first point of view, and merges the first depth image data and the color image data to thereby obtain 3D image data.

4. The apparatus of claim 3, wherein:
the second storage unit is configured to store color images from a plurality of points of views associated with the object as a plurality of color image data of a 2D data format, independent of the first data, and
the processing unit is configured to generate second color image data based on a forward projection angle, with respect to a point of view of each of the plurality of color image data, from an intersecting point where a backward projection is made from the first point of view to the MLS surface, and to merge the first depth image data and the second color image data to thereby obtain the 3D image data, when color image data of the first point of view is different from the plurality of color image data.

5. The apparatus of claim 4, wherein the second color image data is generated based on a linear addition of the plurality of color image data using coefficients that are obtained based on the forward projection angle.

6. The apparatus of claim 4, wherein the processing unit is configured to compare a distance between a point of view selected from the plurality of points of views of the color image data and the intersecting point with a depth value of direction from the selected point of view toward the intersecting point.

7. The apparatus of claim 6, wherein upon the distance between the selected point of view and the intersecting point being greater than the depth value of direction from the selected point of view toward the intersecting point, the processing unit is configured to set a coefficient associated with the selected point of view, in the linear addition, to zero.

8. A method of processing a 3D image, comprising:
storing depth image data associated with an object as first data of a 3D data format;
independently storing a plurality of color images associated with the object as color image data of a 2D image format, independent of the first data; and
independently storing a plurality of depth images respectively obtained from plural different viewpoints of the object, independent of the color image data;
merging the plurality of depth image data as the first data, and storing the first data into a single data structure such that the plural different viewpoints are represented as a unified view; and
generating a 3D image data by merging a selected color image of the plurality of color images with the first data.

9. The method of claim 8, wherein the 3D data format is a hierarchical point data format.

10. The method of claim 9, wherein the hierarchical point data format is an octree format.

11. A non-transitory computer-readable recording medium having stored thereon instructions for causing a computer to implement a method of processing a 3D image, the instructions comprising:
an instruction set of storing depth image data associated with an object as first data of a 3D data format;
an instruction set of independently storing a plurality of color images associated with the object as color image data of a 2D image format, independent of the first data;
an instruction set of independently storing a plurality of depth images respectively obtained from plural different viewpoints of the object, independent of the color image data;
an instruction set of merging the plurality of depth image data as the first data, and storing the first data into a single data structure such that the plural different viewpoints are represented as a unified view; and
an instruction set of generating a 3D image data by merging a selected color image of the plurality of color images with the first data.

12. The non-transitory computer-readable recording medium of claim 11, wherein the 3D data format is a hierarchical point data format.

13. The non-transitory computer-readable recording medium of claim 12, wherein the hierarchical point data format is an octree format.

14. The non-transitory computer-readable recording medium of claim 11, further comprising:
an instruction set of generating, using a moving least squares (MLS) projection operator, an MLS surface from the first data;
an instruction set of obtaining, using a ray-surface intersection with respect to the MLS surface, first depth image data of a first resolution from a first point of view; and
an instruction set of merging the first depth image data and the color image data to thereby obtain 3D image data.

15. The non-transitory computer-readable recording medium of claim 14, wherein:
the instruction set of storing the color image data stores color images from a plurality of points of views associated with the object, as a plurality of color image data of a 2D data format, independent of the first data, and
the instruction set of merging to thereby obtain 3D image data generates second color image data based on a forward projection angle, with respect to a point of view of each of the plurality of color image data, from an intersecting point where a backward projection is made from the first point of view to the MLS surface, and merges the first depth image data with the second color image data to thereby obtain the 3D image data, when color image data of the first point of view is different from the plurality of color image data.

16. The non-transitory computer-readable recording medium of claim 15, wherein the second color image data is generated based on a linear addition of the plurality of color image data using coefficients that are obtained based on the forward projection angle.

17. The non-transitory computer-readable recording medium of claim 16, further comprising:
an instruction set of comparing a distance between a point of view selected from the plurality of points of views of the color image data and the intersecting point with a depth value of direction from the selected point of view toward the intersecting point.

18. The non-transitory computer-readable recording medium of claim 17, wherein upon the distance between the selected point of view and the intersecting point being greater than the depth value of direction from the selected point of view toward the intersecting point, a coefficient associated with the selected point of view in the linear addition is set to zero.

19. A non-transitory computer-readable recording medium having stored thereon instructions for causing a computer to implement a method of processing a 3D image, the instructions comprising:

an instruction set of storing a plurality of color images associated with an object as color image data of a 2D data format;

an instruction set of generating, using an MLS projection operator, an MLS surface from first depth image data; and an instruction set of obtaining, using a ray-surface intersection with respect to the MLS surface, second depth image data of a first resolution, such that the first resolution is adjusted to be the same as a resolution of the color image data to be merged with the second depth image data, wherein the plurality of color images is stored independently from the first depth image data.

20. A non-transitory computer-readable recording medium having stored thereon instructions for implementing a method of processing a 3D image, the instructions comprising:

an instruction set of storing a plurality of depth images respectively obtained from a plurality of different viewpoints of an object;

an instruction set of independently storing a plurality of color images associated with the object as color image data of a 2D data format, independent of the plurality of depth image data; and an instruction set of merging the plurality of depth images and storing the merged plurality of depth images into a single data structure.

21. The non-transitory computer-readable recording medium of claim 20, comprising:

an instruction set of generating first data of a hierarchical point data format from the plurality of depth image data;

an instruction set of generating, using an MLS projection operator, an MLS surface from the first data;

an instruction set of obtaining, using a ray-surface intersection with respect to the MLS surface, first depth image data of a first defining from a first point of view; and an instruction set of merging the first depth image data and the color image data to thereby obtain 3D image data.

22. The apparatus of claim 1, wherein the processing unit merges a selected color image of the plurality of color images with the first data to obtain 3D image data such that the color image data is color shaded with the depth image data being viewed from a respective viewpoint.

* * * * *